US012812715B2

(12) United States Patent
Korlapati et al.

(10) Patent No.: US 12,812,715 B2
(45) Date of Patent: Nov. 24, 2026

(54) SYSTEMS AND METHODS FOR IDENTIFYING AND REESTABLISHING FAILED COMMUNICATION INTERFACES IN A WIRELESS NETWORK

(71) Applicant: Verizon Patent and Licensing Inc., Basking Ridge, NJ (US)

(72) Inventors: Radhika Korlapati, Hyderabad (IN); Syed Imran Hossain, Temple Terrace, FL (US); Sachin Iyengar, John's Creek, GA (US); Raghavender Parigi, Hyderabad (IN); Ramesh Pondugala, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 276 days.

(21) Appl. No.: 18/649,067

(22) Filed: Apr. 29, 2024

(65) Prior Publication Data

US 2025/0338339 A1 Oct. 30, 2025

(51) Int. Cl.
*H04W 76/19* (2018.01)
*H04L 43/0811* (2022.01)
*H04W 92/00* (2009.01)

(52) U.S. Cl.
CPC ......... *H04W 76/19* (2018.02); *H04L 43/0811* (2013.01); *H04W 92/00* (2013.01)

(58) Field of Classification Search
CPC ........... H04M 1/724634; H04M 3/436; H04M 1/72463
See application file for complete search history.

(56) References Cited

U.S. PATENT DOCUMENTS

| | | | | |
|---|---|---|---|---|
| 9,807,661 | B1 * | 10/2017 | Manepalli | H04W 52/0258 |
| 9,826,419 | B2 * | 11/2017 | Kotkar | H04W 52/0229 |
| 2016/0014839 | A1 * | 1/2016 | Liu | H04W 76/11<br>370/329 |
| 2016/0286597 | A1 * | 9/2016 | Eriksson | H04W 76/19 |
| 2020/0287977 | A1 * | 9/2020 | Cui | H04L 67/51 |
| 2022/0174514 | A1 * | 6/2022 | Kahn | H04W 76/12 |
| 2022/0322065 | A1 * | 10/2022 | Shekhar | H04W 24/08 |
| 2023/0015038 | A1 * | 1/2023 | Vankayala | H04W 24/08 |
| 2023/0388178 | A1 * | 11/2023 | Kim | H04L 41/0668 |
| 2024/0223438 | A1 * | 7/2024 | Luthra | H04L 41/40 |
| 2024/0406765 | A1 * | 12/2024 | Kalia | H04L 41/0663 |

* cited by examiner

*Primary Examiner* — Christopher M Brandt

(57) ABSTRACT

In some implementations, a device may receive event information associated with a virtual radio access network (vRAN) communication failure, identifying, by the device and based on the event information, that a communication interface between a vRAN network function (NF) and a Core network NF has failed. The device may initiate a reestablishment of the communication interface. In a radio access network (RAN) and Core domain, interfaces across various NFs may be key for effective end-to-end communications. Monitoring and identifying communication failures across the RAN and Core with specific event information may be critical. An ability to consider appropriate factors for communication failures may be enabled to dynamically reestablish the communication interface.

20 Claims, 6 Drawing Sheets

SYSTEMS AND METHODS FOR IDENTIFYING AND REESTABLISHING FAILED COMMUNICATION INTERFACES IN A WIRELESS NETWORK

BACKGROUND

Communication systems are widely deployed to provide various telecommunication services such as telephony, video, data, messaging, and broadcasts. A network may include one or more network nodes that support communication for wireless communication devices.

DETAILED DESCRIPTION OF EXAMPLE EMBODIMENTS

Figure 1:
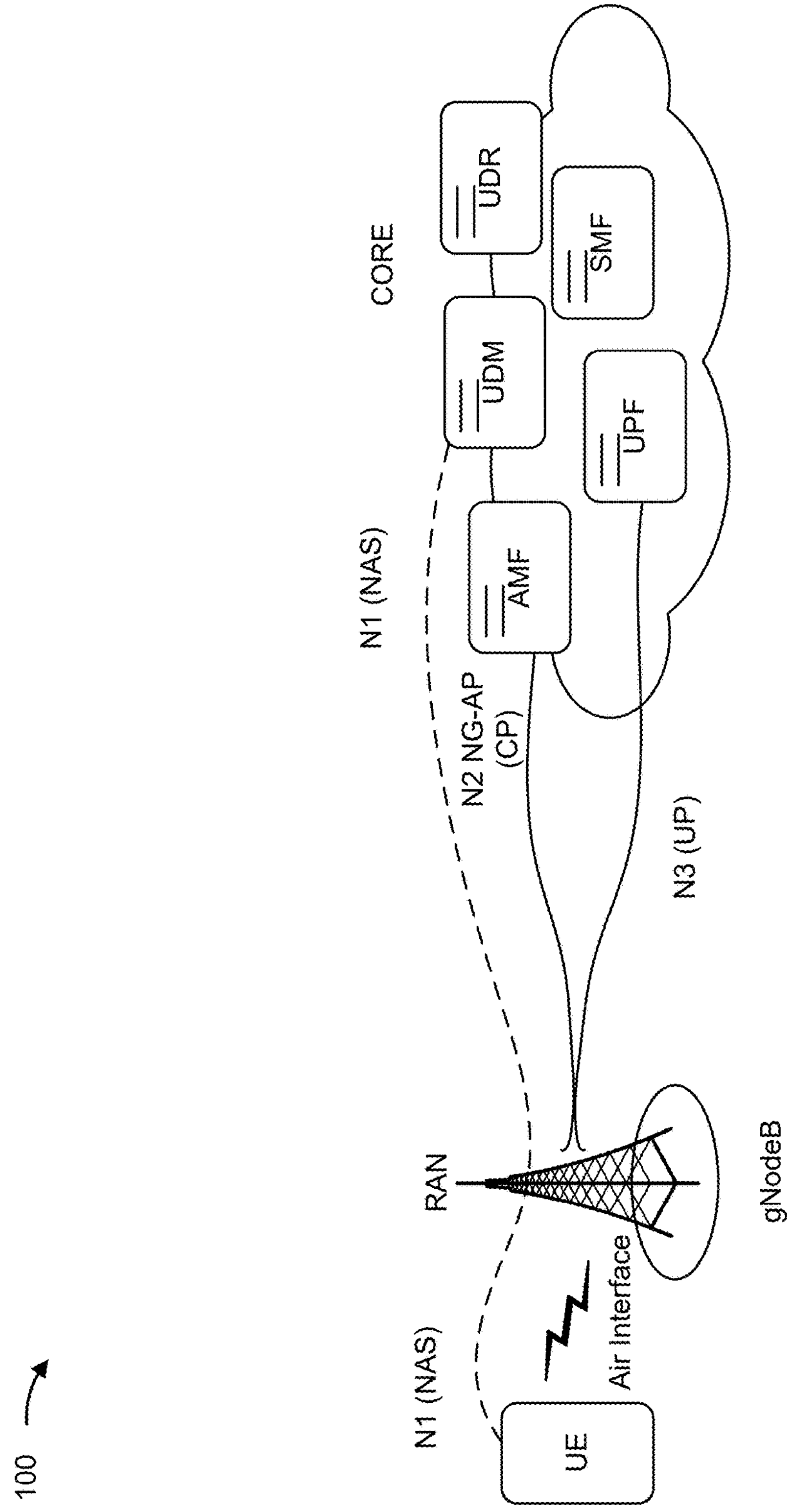
FIG. 1 is a diagram of an example associated with a wireless network.

The following detailed description of example implementations refers to the accompanying drawings. The same reference numbers in different drawings may identify the same or similar elements.

A wireless network may include a virtualized radio access network (RAN) (vRAN) and a Core network. The vRAN may include one or more virtual distributed units (vDUs) and one or more virtual central units (vCUs). A network node, such as a gNodeB, may be associated with a vDU and a vCU. The Core network may include a plurality of network functions, such as an access and mobility management function (AMF), a unified data management (UDM), and/or a user plane function (UPF). Within the wireless network, due to software upgrades and/or due to specific virtual machine (VM) failures or a failure of a pod associated with a node (e.g., a pod may run one or more applications), a communication related interface towards a core virtualized network function may become impacted. For example, an N1 interface between a user equipment (UE) and the AMF may become impacted, an N2 interface between the gNodeB and the AMF may become impacted, or an N3 interface between the gNodeB and the UPF may become impacted. When the communication interface is broken, user connected calls may be dropped, which may result in a poor user experience with network services.

In some cases, identifying communication interfaces that are failed, broken and/or impacted may be a challenge. The wireless network may not employ an entity and/or a mechanism for detecting such broken communication interfaces and/or for reestablishing the broken communication interfaces. As a result, broken communication interfaces may persist for an excessive amount of time in the wireless vRAN, during which time the network performance may be degraded.

In some implementations, a process of identifying failed communication interfaces (such as N2 interfaces or N3 Interfaces) between a wireless vRAN and a 5G Core may be self-operated using specific generated events. Appropriate communication interfaces may be reestablished using dissecting techniques. Further, a state of various communication interfaces may be maintained, and a number of times that reestablishments are needed for communication interfaces may be recorded on a network specific basis for future prediction.

In some implementations, in a RAN and Core domain, interfaces across various NFs may be key for effective end-to-end communications. Monitoring and identifying communication failures across the RAN and Core with specific event information may be critical. An ability to consider appropriate factors for communication failures may be enabled to dynamically reestablish the communication interface.

In some implementations, by identifying failed communication interfaces and reestablishing such communication interfaces associated with the wireless vRAN, failed communication interfaces may be resolved in a reasonable amount of time, which may improve an overall network performance. Although failed communication interfaces may still occur due to software upgrades, and/or specific VM failures, the amount of time taken to resolve the communication interfaces may be improved, thereby positively affecting the overall network performance.

FIG. 1 is a diagram of an example 100 associated with a wireless network. As shown in FIG. 1, example 100 includes a UE (e.g., UE 402), a RAN (e.g., RAN 404) that includes a gNodeB, a UDR (e.g., UDR 412), a UDM (e.g., UDM 414), an AMF (e.g., AMF 422), an SMF (e.g., SMF 424), and a UPF (e.g., UPF 426). The UDR, the UDM, the AMF, the SMF, and the UPF may be associated with a Core network (e.g., Core network 406).

A 5G standalone (SA) deployment may include the UE (e.g., a 5G UE), the RAN (e.g., a 5G RAN), and a core network (e.g., 5G Core) that includes at least the UDR, the UDM, the AMF, the SMF, and the UPF. The gNodeB may communicate with the AMF over an N2 interface using a Next Generation application (NG-AP) protocol (control plane). The UE may communicate with the AMF over an N1 interface, where the N1 interface may be used to carry non-access stratum (NAS) messages. The UE may communicate user traffic flows over the air to the gNodeB. The gNodeB may communicate with the UPF over an N3 interface (user plane). In some cases, such interfaces (e.g., N1, N2, and/or N3 interfaces) may become broken, thereby negatively affecting a system performance. Interfaces that have become broken may be identified and reestablished to restore the system performance.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
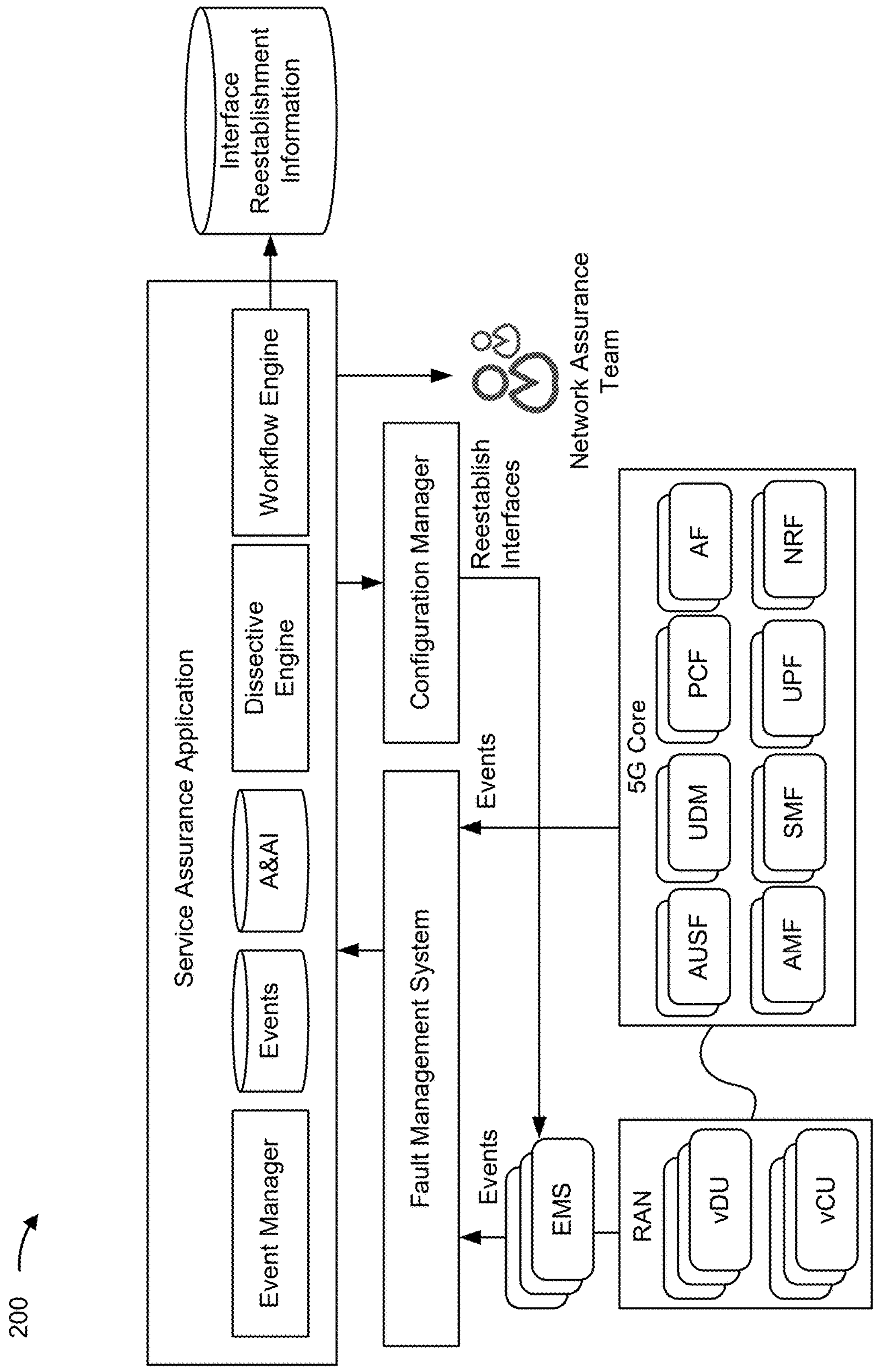
FIG. 2 is a diagram of an example associated with identifying and reestablishing failed communication interfaces in a wireless network.

FIG. 2 is a diagram of an example 200 associated with identifying and reestablishing failed communication interfaces in a wireless network. As shown in FIG. 2, example 200 includes a RAN (e.g., RAN 404) (or vRAN), a Core network (e.g., Core network 406), an element management system (EMS), a fault management system (FMS), a configuration manager (e.g., configuration manager 436), a service assurance application, and an interface reestablishment database. The RAN may be associated with a plurality of virtualized distributed units (vDUs) and a plurality of virtualized centralized units (vCUs). The Core network may be associated with a UDM, an AUSF, a policy control function (PCF), an application function (AF), an AMF, an SMF, a UPF, and a network repository function (NRF). The service assurance application may be associated with an event manager, an events database, an active and available inventory (A&AI) database, a dissective engine e., and a workflow engine.

In some implementations, the AMF may be a control plane function in the Core network that handles connections between a vRAN and other 5G Core network functions (NFs) for mobility management tasks. An NF may be a virtualized network function (VNF) or a containerized network function (CNF). The UPF may be responsible for policy enforcement for a user plane. The UPF may act as an anchor for intra radio access technology (RAT) and inter RAT mobility. The UPF may be responsible for power routing/forwarding, policy rule enforcement for the user plane, downlink packet buffering, and/or user plane quality of service (QoS) handling. A communication between the vRAN and these 5G Core NFs may be crucial for maintaining call flows (e.g., UE registration, packet data unit (PDU) session management, and/or mobility management functions).

In some implementations, the vRAN may include vDU network functions and vCU network functions, which may be deployed in multiple locations and may be managed by multiple EMS systems, respectively. In some implementations, the dissective engine may break events information to a granular level and search on specific keywords for failed communication interfaces, such as N2 interfaces or N3 interfaces. The events information may be periodically received from the EMS. By searching for specific keywords, the dissective engine may be able to determine whether events information is associated with a breakage of an N2 interface, an N3 interface, or another type of interface. The dissective engine may identify vRAN NF associations with various 5G Core NFs based on the events information. The dissective engine may correlate the events information with information on previous communication interfaces, which may be maintained by the interface reestablishment database. In other words, the dissective engine may have information regarding certain vRAN NFs that have communication interfaces with certain 5G Core NFs, which may serve as baseline knowledge. Based on the events information in combination with this baseline knowledge, the dissective engine may determine that a communication interface associated with a certain vRAN NF is broken, and that the communication interface should be to a certain 5G Core NF. In some implementations, the workflow engine may identify specific associations between vRAN and 5G Core NFs, and the workflow engine may identify active instances. Depending on which instances are active, the workflow engine may identify an appropriate EMS for vRAN NFs. The workflow engine may connect to the appropriate EMS via the configuration manager. The workflow engine may instruct the appropriate EMS to reestablish the communication interface that is broken. The workflow engine may provide information on the specific vRAN NF instances and the specific 5G Core NF instances for which the communication interface should be restored.

In some implementations, after reestablishing the communication interface (e.g., N2 interfaces or N3 interfaces), the workflow engine may observe the communication between the vRAN and the 5G Core NFs. Depending on a success or failure scenario of the instances, time and NF instance information may be recorded into the interface reestablishment database for future predictions. In some implementations, the configuration manager may establish a connection towards the appropriate EMS with required privileges. The configuration manager may instruct the EMS with interface information to reestablish the communication interfaces.

In some implementations, in order to reestablish communication interfaces between the vRAN and the Core network, the service assurance application may receive an indication of events related to vRAN communication failures. The service assurance application may obtain complete inventory information from the A&AI database (e.g., an A&AI inventory system). The service assurance application may check a state of vRAN NFs. The service assurance application may obtain an indication of vRAN NF events (or events information) from respective EMSs. The service assurance application, via the dissective engine, may break the events information on specific keywords for failed communication interfaces. The service assurance application, via the dissective engine, may identify the vRAN NFs associations with core NFs related to events. The service assurance application, via the dissective engine, may identify a previous communication interfaces list.

In some implementations, when events are not matching, the service assurance application may obtain an indication of vRAN NF events (or event information) from a next EMS, and then repeat actions related to breaking the events information on specific keywords, identifying the vRAN NFs associations, and identifying the previous communication interfaces list.

In some implementations, the service assurance application, via the dissective engine, may initiate the workflow engine. The service assurance application, via the workflow engine, may further identify a specific relation between the vRAN and the Core network based on active and disaster recovery (DR) instances. The service assurance application, via the workflow engine, may initiate the corresponding EMS via the configuration manager for reestablishing the communication interfaces between a specific vRAN NF and a specific 5G Core NF. The service assurance application, via the workflow engine, may examine the communication between the vRAN VNF and the 5G Core NF for a period of time (e.g., a few minutes) and confirm that the communication is established successfully. The service assurance application, via the workflow engine, may record reestablishment process information for future predictions in the interface reestablishment database. The service assurance application, via the workflow engine, may notify of new interface establishments between the vRAN and the Core network to respective network assurance teams.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
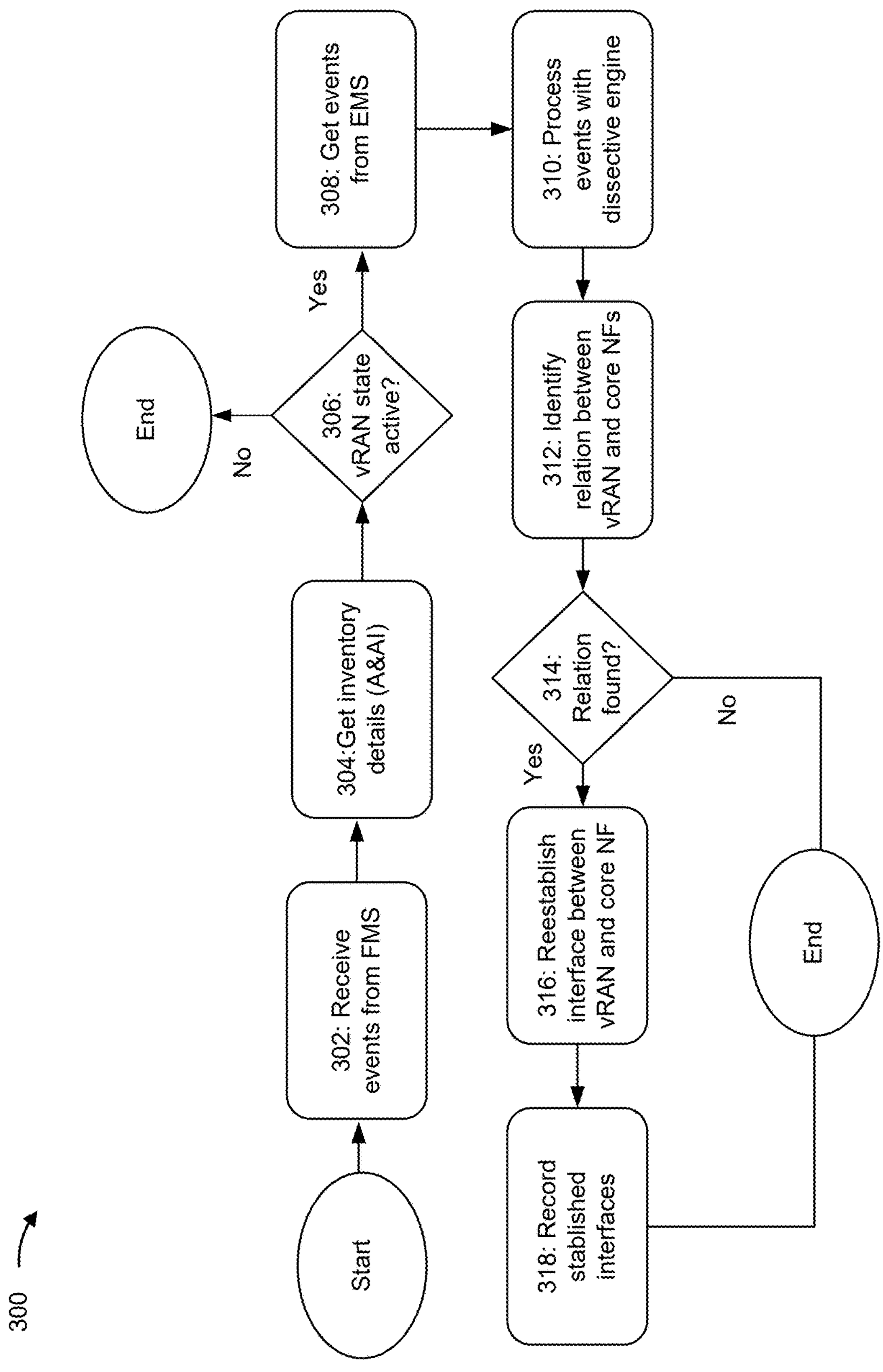
FIG. 3 is a diagram of an example associated with identifying and reestablishing failed communication interfaces in a wireless network.

FIG. 3 is a diagram of an example 300 associated with identifying and reestablishing failed communication interfaces in a wireless network.

As shown by reference number 302, a service assurance application may receive an indication of events from a fault management system. As shown by reference number 304, the service assurance application may obtain inventory information (e.g., from an A&AI database). As shown by reference number 306, the service assurance application may determine whether a vRAN state is active. As shown by reference number 308, the service assurance application may obtain an indication of events from an EMS. As shown by reference number 310, the service assurance application, via a dissective engine, may process the events from the EMS. As shown by reference number 312, the service assurance application, via the dissective engine, may identify a relation between vRAN NFs and Core network NFs. As shown by reference number 314, the service assurance application, via the dissective engine, may find the relation between the vRAN NFs and the Core network NFs. As shown by reference number 316, when the relation is found, the service assurance application, via a workflow engine, may reestablish a communication interface between the vRAN NFs and the Core network NFs. As shown by reference number 318, the service assurance application, via the workflow engine, may record the established communication interfaces.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
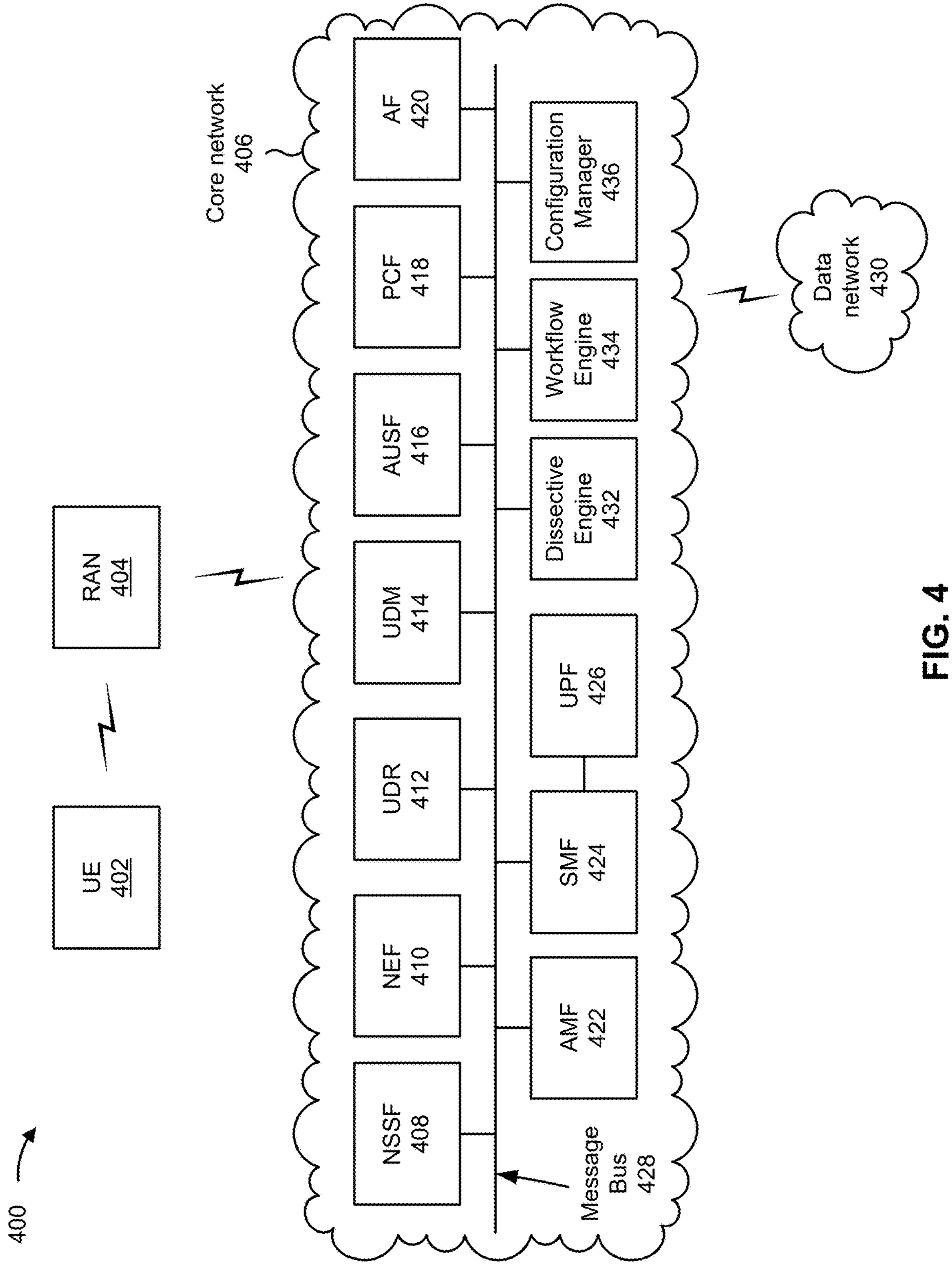
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a UE 402, a RAN 404, a Core network 406, and a data network 430. Devices and/or networks of example environment 400 may interconnect via wired connections, wireless connections, or a combination of wired and wireless connections.

The UE 402 may include one or more devices capable of receiving, generating, storing, processing, and/or providing information, such as information described herein. For example, the UE 402 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 404 may support, for example, a cellular RAT. The RAN 404 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 402. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 404 may transfer traffic between the UE 402 (e.g., using a cellular RAT), one or more base stations (e.g., using a wireless interface or a backhaul interface, such as a wired backhaul interface), and/or the Core network 406. The RAN 404 may provide one or more cells that cover geographic areas.

In some implementations, the RAN 404 may perform scheduling and/or resource management for the UE 402 covered by the RAN 404 (e.g., the UE 402 covered by a cell provided by the RAN 404). In some implementations, the RAN 404 may be controlled or coordinated by a network controller, which may perform load balancing, network-level configuration, and/or other operations. The network controller may communicate with the RAN 404 via a wireless or wireline backhaul. In some implementations, the RAN 404 may include a network controller, a self-organizing network (SON) module or component, or a similar module or component. In other words, the RAN 404 may perform network control, scheduling, and/or network management functions (e.g., for uplink, downlink, and/or sidelink communications of the UE 402 covered by the RAN 404).

In some implementations, the Core network 406 may include an example functional architecture in which systems and/or methods described herein may be implemented. For example, the Core network 406 may include an example architecture of a 5G next generation (NG) Core network included in a 5G wireless telecommunications system. While the example architecture of the Core network 406 shown in FIG. 4 may be an example of a service-based architecture, in some implementations, the Core network 406 may be implemented as a reference-point architecture and/or a 4G Core network, among other examples.

As shown in FIG. 4, the Core network 406 may include a number of functional elements. The functional elements may include, for example, a network slice selection function (NSSF) 408, a network exposure function (NEF) 410, a unified data repository (UDR) 412, a UDM 414, an authentication server function (AUSF) 416, a PCF 418, an AF 420, an AMF 422, an SMF 424, and/or a UPF 426. These functional elements may be communicatively connected via a message bus 428. Each of the functional elements shown in FIG. 4 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 408 may include one or more devices that select network slice instances for the UE 402. The NSSF 408 may allow an operator to deploy multiple substantially independent end-to-end networks potentially with the same infrastructure. In some implementations, each slice may be customized for different services. The NEF 410 may include one or more devices that support exposure of capabilities and/or events in the wireless telecommunications system to help other entities in the wireless telecommunications system discover network services.

The UDR 412 may include one or more devices that provide a converged repository, which may be used by network functions to store data. For example, a converged repository of subscriber information may be used to service a number of network functions. The UDM 414 may include one or more devices to store user data and profiles in the wireless telecommunications system. The UDM 414 may generate authentication vectors, perform user identification handling, perform subscription management, and perform other various functions. The AUSF 416 may include one or more devices that act as an authentication server and support the process of authenticating the UE 402 in the wireless telecommunications system.

The PCF 418 may include one or more devices that provide a policy framework that incorporates network slicing, roaming, packet processing, and/or mobility management, among other examples. The AF 420 may include one or more devices that support application influence on traffic routing, access to the NEF 410, and/or policy control, among other examples. The AMF 422 may include one or more devices that act as a termination point for NAS signaling and/or mobility management, among other examples. The SMF 424 may include one or more devices that support the establishment, modification, and release of communication sessions in the wireless telecommunications system. For example, the SMF 424 may configure traffic steering policies at the UPF 426 and/or may enforce UE internet protocol (IP) address allocation and policies, among other examples. The UPF 426 may include one or more devices that serve as an anchor point for intra-RAT and/or inter-RAT mobility. The UPF 426 may apply rules to packets, such as rules pertaining to packet routing, traffic reporting, and/or handling user plane QoS, among other examples. The message bus 428 may represent a communication structure for communication among the functional elements. In other words, the message bus 428 may permit communication between two or more functional elements.

The data network 430 may include one or more wired and/or wireless data networks. For example, the data network 430 may include an Internet Protocol multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The dissective engine 432 may break events information to a granular level and search on specific keywords for failed communication interfaces, such as N2 interfaces or N3 interfaces. The workflow engine 434 may identify specific associations between vRAN and 5G Core NFs. The configuration manager 436 may instruct an EMS with interface information to reestablish the failed communication interfaces.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
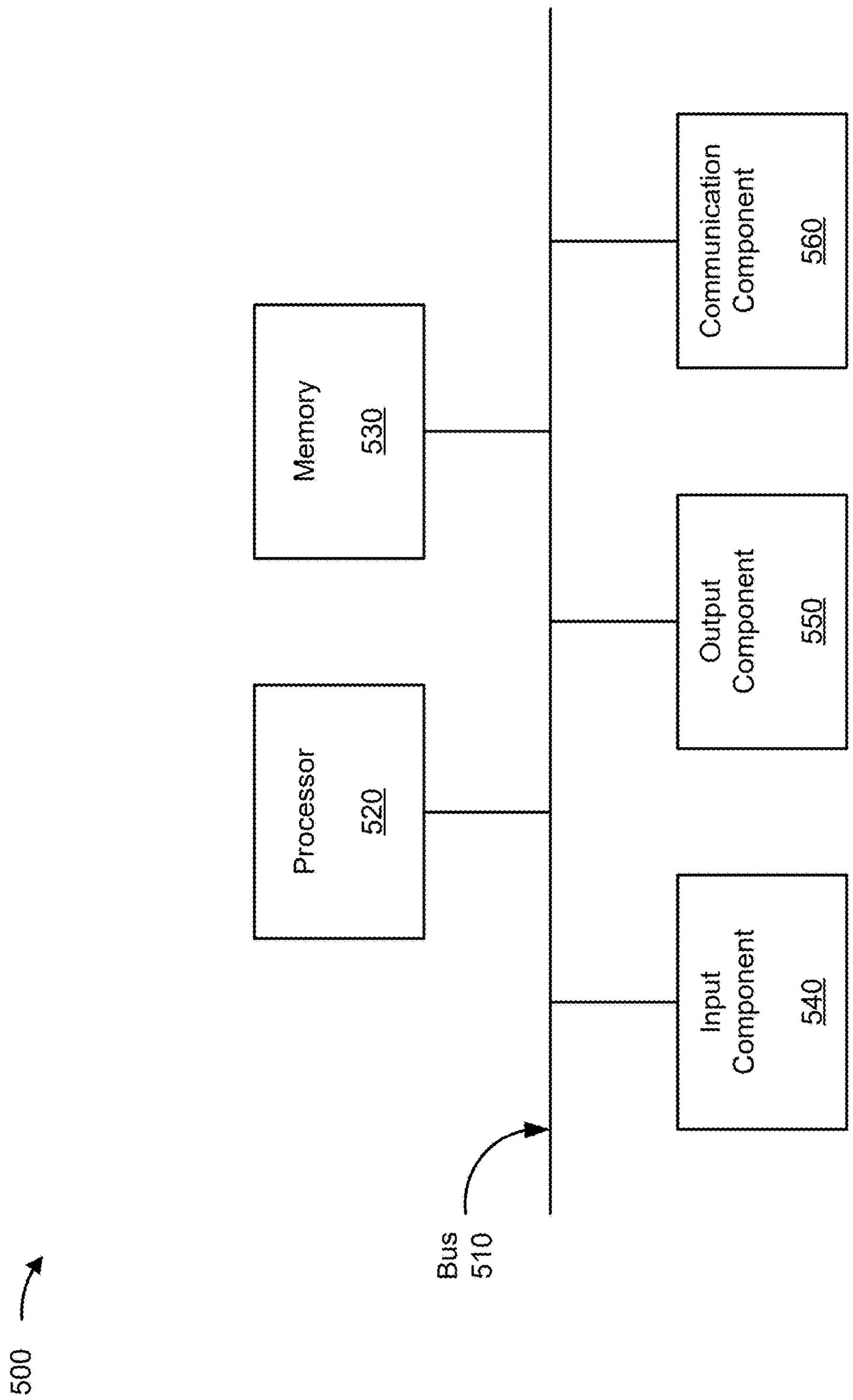
FIG. 5 is a diagram of example components of one or more devices of FIG. 4.

FIG. 5 is a diagram of example components of a device 500 associated with identifying and reestablishing failed communication interfaces in a wireless network. The device 500 may correspond to a device (e.g., a device associated with dissective engine 432, workflow engine 434, and/or configuration manager 436). In some implementations, the network device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
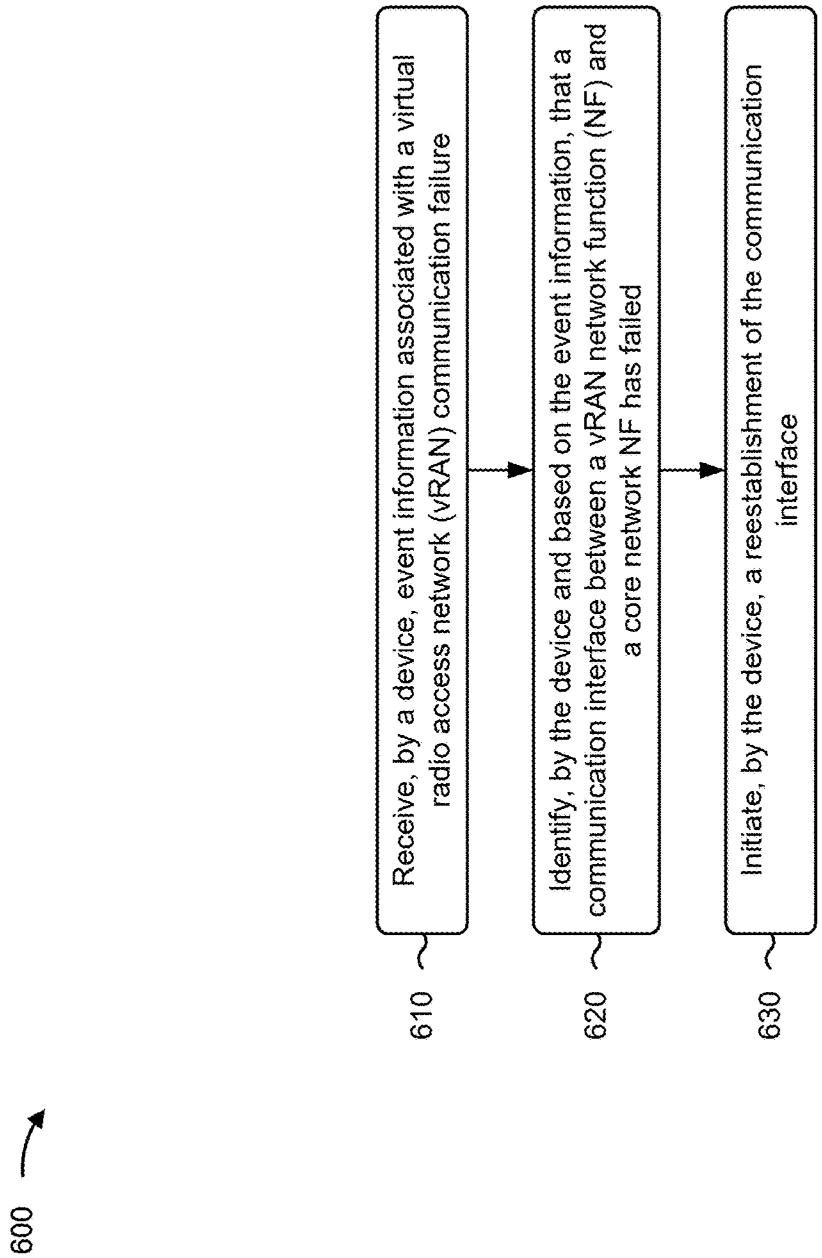
FIG. 6 is a flowchart of an example process associated with identifying and reestablishing failed communication interfaces in a wireless network.

FIG. 6 is a flowchart of an example process 600 associated with identifying and reestablishing failed communication interfaces in a wireless network. In some implementations, one or more process blocks of FIG. 6 may be performed by a device (e.g., a device associated with dissective engine 432, workflow engine 434, and/or configuration manager 436). In some implementations, one or more process blocks of FIG. 6 may be performed by another entity or a group of entities separate from or including the device. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, by a device, event information associated with a vRAN communication failure (block 610). The event information may be periodically collected for a vRAN NF by an EMS associated with the vRAN NF. The vRAN NF may include one or more vDUs and one or more vCUs, and the one or more vDUs and the one or more vCUs may be deployed in multiple locations. Each vDU or vCU may be managed by a certain EMS.

As shown in FIG. 6, process 600 may include identifying, by the device and based on the event information, that a communication interface between the vRAN NF and a Core network NF has failed (block 620). The device, when identifying that the communication interface has failed, may parse the event information to a granular level to obtain granular event information. The device, when identifying that the communication interface has failed, may search on specific keywords in the granular event information that indicate a failure of the communication interface. The device may access a data store that stores information on previous communication interfaces associated with a vRAN, where the communication interface may be identified as failed based on a correlation of the event information with the information on previous communication interfaces associated with the vRAN. The communication interface may fail based on a software upgrade or a virtual machine failure (or pod failure). The communication interface may be associated with an N2 interface or an N3 interface. A failure of the communication interface may be associated with a total failure of the communication interface, a degraded performance associated with the communication interface, or an intermittent breakage associated with the communication interface.

As shown in FIG. 6, process 600 may include initiating, by the device, a reestablishment of the communication interface (block 630). The device, when initiating the reestablishment, may instruct an element management system associated with the vRAN NF to reestablish the communication interface. The device may initiate a corresponding element management system via a configuration manager for reestablishing the communication interfaces between a specific vRAN NF towards a 5G Core specific NF. The device may examine the communication interface after the reestablishment. The device may store a record associated with the reestablishment of the communication interface, where the record may indicate whether the reestablishment was a success or a failure, and the record may be useable for future predictions associated with failed communication interfaces.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
- receiving, by a device, event information associated with a communication failure of a virtual radio access network (vRAN);
- identifying, by the device and based on the event information, that a communication interface between a vRAN network function (vRAN NF) and a Core network NF has failed;
- initiating, by the device, a reestablishment of the communication interface, wherein initiating the reestablishment comprises instructing, by the device and via a configuration manager, an element management system associated with the vRAN NF to reestablish the communication interface; and
- storing, by the device, a record associated with the reestablishment of the communication interface in an interface reestablishment database, wherein the record indicates whether the reestablishment was a success or failure, and wherein the record is useable for future predictions associated with failed communication interfaces.

2. The method of claim 1, wherein identifying that the communication interface has failed comprises:
- parsing, by the device, the event information to a granular level to obtain granular event information; and
- searching, by the device, for specific keywords in the granular event information that indicate a failure of the communication interface.

3. The method of claim 1, further comprising:
- accessing, by the device, a data store that stores information on previous communication interfaces associated with the vRAN, wherein the communication interface is identified as failed based on a correlation of the event information with the information on previous communication interfaces associated with the vRAN.

4. The method of claim 1, wherein instructing the element management system comprises:
- providing, by the device and via the configuration manager, interface information identifying the communication interface to the element management system.

5. The method of claim 1, wherein a failure of the communication interface is associated with one of: a total failure of the communication interface, a degraded performance associated with the communication interface, or an intermittent breakage associated with the communication interface.

6. The method of claim 1, further comprising:
- examining, by the device, the communication interface for a period of time after the reestablishment to confirm that the communication interface was successfully reestablished.

7. The method of claim 1, wherein the communication interface is associated with an N2 interface or an N3 interface.

8. The method of claim 1, wherein the communication interface has failed as a result of a software upgrade or a virtual machine failure.

9. A device, comprising:
- one or more processors configured to:
  - receive event information associated with a communication failure of a virtual radio access network (vRAN),
  - identify, based on the event information, that a communication interface between a vRAN network function (vRAN NF) and a Core network NF has failed;
  - initiate a reestablishment of the communication interface, wherein the one or more processors are configured to initiate the reestablishment by instructing, via a configuration manager, an element management system associated with the vRAN NF to reestablish the communication interface; and store a record associated with the reestablishment of the communication interface in an interface reestablishment database, wherein the record indicates whether the reestablishment was a success or a failure, and wherein the record is useable for future predictions associated with failed communication interfaces.

10. The device of claim 9, wherein the one or more processors, to identify that the communication interface has failed, are configured to:

parse the event information to a granular level to obtain granular event information; and search for specific keywords in the granular event information that indicate a failure of the communication interface.

11. The device of claim 9, wherein the one or more processors are configured to:

access a data store that stores information on previous communication interfaces associated with the vRAN, wherein the communication interface is identified as having failed based on a correlation of the event information with the information on previous communication interfaces associated with the vRAN.

12. The device of claim 9, wherein the one or more processors are configured to instruct the element management system by providing, via the configuration manager, interface information identifying the communication interface to the element management system.

13. The device of claim 9, wherein a failure of the communication interface is associated with one of: a total failure of the communication interface, a degraded performance associated with the communication interface, or an intermittent breakage associated with the communication interface.

14. The device of claim 9, wherein the one or more processors are configured to:

examine the communication interface for a period of time after the reestablishment to confirm that the communication interface was successfully reestablished.

15. The device of claim 9, wherein the communication interface is associated with an access and mobility management function (AMF) device or a user plane function (UPF) device.

16. A non-transitory computer-readable medium storing a set of instructions, the set of instructions comprising:

one or more instructions that, when executed by one or more processors of a device, cause the device to:

receive event information associated with a communication failure of a virtual radio access network (vRAN), identify, based on the event information, that a communication interface between a vRAN network function (vRAN NF) and a Core network NF has failed;

initiate a reestablishment of the communication interface, wherein initiating the reestablishment comprises instructing, by the device and via configuration manager, an element management system associated with the vRAN NF to reestablish the communication interface; and store a record associated with the reestablishment of the communication interface in an interface reestablishment database, wherein the record indicates whether the reestablishment was a success or a failure, and wherein the record is useable for future predictions associated with failed communication interfaces.

17. The non-transitory computer-readable medium of claim 16, wherein the one or more instructions, that cause the device to identify that the communication interface has failed, cause the device to:

parse the event information to a granular level to obtain granular event information; and search for specific keywords in the granular event information that indicate a failure of the communication interface.

18. The non-transitory computer-readable medium of claim 16, wherein the one or more instructions, when executed by the one or more processors, further cause the device to:

access a data store that stores information on previous communication interfaces associated with the vRAN, wherein the communication interface is identified as failed based on a correlation of the event information with the information on previous communication interfaces associated with the vRAN; and examine the communication interface for a period of time after the reestablishment to confirm that the communication interface was successfully reestablished.

19. The non-transitory computer-readable medium of claim 16, wherein a failure of the communication interface is associated with one of: a total failure of the communication interface, a degraded performance associated with the communication interface, or an intermittent breakage associated with the communication interface.

20. The non-transitory computer-readable medium of claim 16, wherein the communication interface is associated with an access and mobility management function (AMF) device or a user plane function (UPF) device.

* * * * *